(12) United States Patent
Dahlén et al.

(10) Patent No.: US 9,204,313 B2
(45) Date of Patent: Dec. 1, 2015

(54) METHOD AND NODE FOR ENABLING CENTRAL PROCESSING OF LOCAL INFORMATION

(75) Inventors: Anders Dahlén, Västerhaninge (SE); Paul Stjernholm, Lidingö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1012 days.

(21) Appl. No.: 13/129,498

(22) PCT Filed: Nov. 17, 2008

(86) PCT No.: PCT/SE2008/051318
§ 371 (c)(1),
(2), (4) Date: May 16, 2011

(87) PCT Pub. No.: WO2010/056172
PCT Pub. Date: May 20, 2010

(65) Prior Publication Data
US 2011/0223918 A1    Sep. 15, 2011

(51) Int. Cl.
*H04W 36/00* (2009.01)
*H04W 24/00* (2009.01)

(52) U.S. Cl.
CPC ................................. *H04W 24/00* (2013.01)

(58) Field of Classification Search
CPC ..... H04W 24/02; H04W 24/00; H04W 64/00; H04W 88/10; H04W 36/30; H04W 48/16; H04W 4/025; H04W 76/02; H04W 88/08; H04W 24/10; H04W 48/08; H04W 72/042; H04W 88/06; H04W 88/085; H04W 12/06; H04W 16/14; H04W 16/26; H04W 24/08; H04B 7/024; H04B 7/0452; H04B 7/0639; H04B 7/0417; H04B 7/063; H04B 7/0691; H04B 7/0456; H04B 7/0619; H04B 7/0665; H04B 7/0697; H04B 7/155; H04B 7/26; H04B 7/2606; H04B 10/25754; H04B 10/27; H04B 1/0003; H04B 1/707

USPC .......................................... 455/436; 370/328
See application file for complete search history.

(56) References Cited

U.S. PATENT DOCUMENTS

| 6,963,585 B1 * | 11/2005 | Le Pennec et al. ........... 370/468 |
| 2009/0131057 A1 * | 5/2009 | Dimou .......................... 455/436 |
| 2009/0232013 A1 * | 9/2009 | Kumpula et al. ............. 370/252 |

FOREIGN PATENT DOCUMENTS

| EP | 2007163 A2 * | 3/2007 |
| EP | 2007163 A2 | 12/2008 |

(Continued)

OTHER PUBLICATIONS

Kudoh, E. et al., "Multihop routing construction for virtual cellular network," Technical Report of IEICE. CS, Communication System, Japan, The Institute of Electronics, Information and Communication Engineers, Jun. 13, 2003, vol. 103, No. 126, pp. 37-42.

(Continued)

*Primary Examiner* — Olumide T Ajibade Akonai
*Assistant Examiner* — Natasha Cosme
(74) *Attorney, Agent, or Firm* — Coats & Bennett, P.L.L.C.

(57) ABSTRACT

The invention relates to a method in a first communication node in a wireless communications network comprising a plurality of second communication nodes for enabling a central processing of local data from second communication nodes in the network. The first communication node establishes (82) an intemode connection in a radio access network of the wireless communications network to a second communication node wherein information is sent of a virtual cell of the first communication node. The first communication node then requests (84) and receives (86) local information from the second communication node. The received local information is then processed (88) into processed data to be used to centrally process the local information of the second communication node. For centrally processing the local information, the processed data is transmitted (90) to a third communication node.

18 Claims, 12 Drawing Sheets

(56) References Cited

FOREIGN PATENT DOCUMENTS

| | | |
|---|---|---|
| WO | 00/11884 | 3/2000 |
| WO | 2007/139460 A1 | 12/2007 |

OTHER PUBLICATIONS

Japanese Office Action dated Nov. 2, 2012 for corresponding JP application No. 2011-536279.

* cited by examiner

METHOD AND NODE FOR ENABLING CENTRAL PROCESSING OF LOCAL INFORMATION

TECHNICAL FIELD

The invention relates to a method and a node within a wireless communications network, in particular, for centrally processing local information of a second communication node.

BACKGROUND

Today's wireless communications networks comprise base stations and related nodes that communicate local information between one another. For example, Evolved Packet System EPS, that is, Long Term Evolution/System Architecture LTE/SAE consists of enhanced packet core (EPC) and evolved UTRAN (EUTRAN). EUTRAN and EPC are connected by an S1 interface. EUTRAN consists of evolved NodeBs, eNBs. The eNBs can be interconnected through an X2 interface supporting network layer traffic. The X2 interface logically represents an internode connection, a point to point link between eNBs, but the physical realization need not be a point to point link. The internode interface comprises an interface for connecting nodes and communicating local information known by base stations. The internode interface may be set up between base stations or controller nodes of the base stations within the radio access network of the wireless communications network, such as eNBs, NodeBs, RBSs, RNCs and or the like.

The function primarily provided by the X2 interface is to support handover. X2 also enables exchange of interference related information, load related information, configuration related information, and/or the like. Typically, an eNB only establishes X2 connections to neighboring eNBs, i.e. if a serving cell of an eNB has a neighbor cell that is served by another eNB then the two eNBs are so called neighboring eNBs. The functions provided by X2 are seen as neighbor related functions, that is, supporting local functionalities between the two eNBs. Interference related information may comprise Inter-Cell Interference Coordination ICIC and/or the like.

By a function called automatic neighbor relation (ANR) a user equipment, UE, within a cell of an eNB detects a neighbor cell of a different eNB and report the neighbor cell to serving eNB. The serving eNB then creates a neighbor relation and sets up an X2 interface to the eNB serving the neighbor cell. In this way an eNB can be commissioned without any X2 relations preconfigured, and as UEs report neighbor cells the X2 relations are built up. To set up an X2 interface data such as IP-addresses, netmask, gateway etc. including the required coordinates or location is used, and/or the like. The logical X2-interface allows a direct communication between the eNBs.

Today, information of radio base stations, retrieved over an Operation Support System (OSS) Interface, may be centrally managed using an Operation Support System (OSS) in a wireless communications network. The OSS does not have connection to more than one vendor's Radio Access Network (RAN) nodes and different vendors OSSes may lack possibility to signal some information that is available over internode interfaces within a RAN.

SUMMARY

There is an object of embodiments herein to provide operation and management of second communication nodes, such as base stations, in an efficient manner.

Embodiments relate to a method in a first communication node in a wireless communications network comprising a plurality of second communication nodes for enabling a central processing of local information from second communication nodes in the network. The first communication node establishes an internode connection to a second communication node within the radio access network, sending information of a virtual cell of the first communication node. The first communication node then requests and receives local information from the second communication node. The received local information is then processed into processed data to be used to centrally process local information of multiple second communication nodes. The result of the central data processing may result in feedback to one or more second communication nodes to adapt, e.g. via actions to update their internal configuration.

Embodiments relate to a first communication node comprising an internode network interface arranged to establish an internode connection in a radio access network of the wireless communications network to a plurality of second communication nodes.

The first communication node further comprises a control unit arranged to request local information from at least one of the second communication nodes over the internode network interface. The control unit is further arranged to receive local information from the at least one second communication node over the internode network interface, and to process the local information into processed data. The processed data enables a central decision to be taken based on the processed data. The control unit is furthermore arranged to send information of a virtual cell of the first communication node during the establishment.

By introducing the centrally processing of information of an internode connection efficient, coherent and automated operation and management of second communication nodes is provided.

BRIEF DESCRIPTION OF THE DRAWINGS

Embodiments will now be described in more detail in relation to the enclosed drawings, in which.

DETAILED DESCRIPTION OF EMBODIMENTS

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
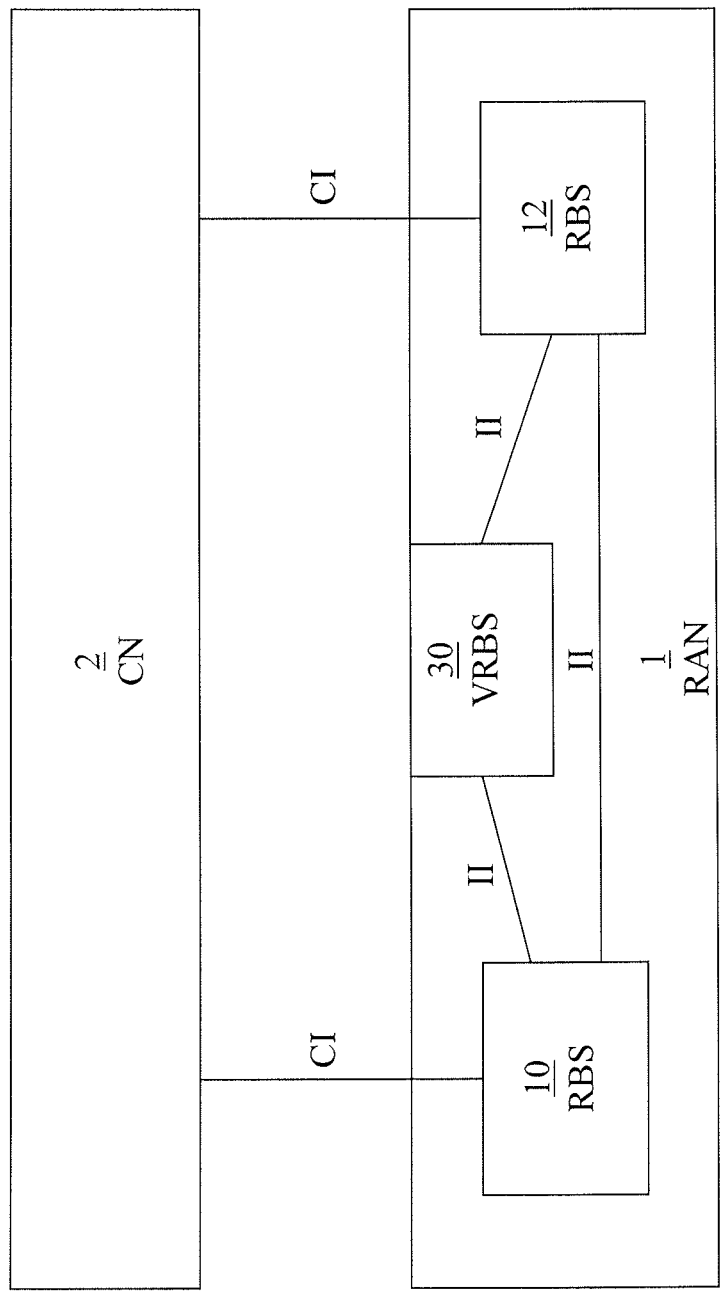
FIG. 1 shows a schematic overview of a mobile communications network.

In FIG. 1, a schematic overview of a wireless communications network including a Radio Access Network, RAN, 1 and a Core Network, CN, 2 is shown. The wireless communications network comprises a functionality and/or at least one new logical entity, herein called Virtual Radio Base Station (VRBS) 30, with an internode interface II of local information within the RAN, e.g. an X2 interface, Iur interface, established towards other radio base stations RBS 10,12, where the internode interface II is used to transport local information known to the base station, such as, local load measures, interference measures, configuration related information, and/or the like. The RBSs are further connected to the CN 2 via a secondary interface C1 from the RAN 1 to the CN 2, for example, an S1 interface to a Core Network Node, such as a Mobility Management Entity MME or the like.

The VRBS 30 requests and collects local information, for example, local load information, for processing the information to, for example, centrally monitoring the load and/or the like. The internode interface II is then not used to send handover information to the VRBS 30 and the cell relation is configured as not to be used for handover.

As disclosed above local information that is sent over the internode interface comprises interference related information, load information and/or the like, but handover information is inhibited by the VRBS 30.

Interference related information may be sent between RBSs having an internode connection. The receiving RBS may in some embodiments not request this information, but to avoid sending the information to RBSs that have no use for it, for example due to lack of supporting functionality, one may, for example, enable RBSs to indicate between RBSs support of interference related features. This would mean that the interference related signaling may be turned off. Moreover, it is likely that the operator will be able by configuration to turn on/off interference related signaling.

Hence, in some embodiments directed toward load monitoring and/or other processes relating to load, it would, for example, be possible to have internode interfaces II between RBSs that is only used to send load information between RBSs.

The load information may be requested when needed e.g. as an event triggered report, or be provided periodically when requested. An RBS request the load information reporting from a neighbor RBS over the internode connection. The neighbor RBS then reports the load information, periodically if so requested. It is also possible to turn off the load reporting mechanism by sending a request to stop reporting. With an event triggered reporting an RBS would send a request to the neighbor RBS to report the load when exceeding a certain load value, or similar when fall below a certain value. Even more advanced event triggers are possible. The load information may be based on standardized RBS measures. The RBS may report load for each Quality of Service Class Identifier, QCI, or divided on Guaranteed Bit Rate, GBR, load and non-GBR load. The load measure is further divided into downlink usage and uplink usage. The load may be expressed in physical resource block, PRB, usage as a percentage of the maximum PRBs.

The deployment envisioned using internode interface is peer-to-peer between RBS, e.g. a distributed solution without a central entity, whereas a central entity in some cases may be preferable.

It is possible for vendors to deploy non standardized solutions to discover capacity bottlenecks. Traditionally, load Key Performance Indicator, KPI, monitoring is part of O&M. O&M standard are not deployed by network vendors as well as RAN and Core Network interfaces. Embodiments herein provide ways of monitoring the load status in the radio access network for an operator to e.g. discover network bottle necks, by a more real-time monitoring, with possibilities to close the loop to additionally provide, for example, load balancing functionalities.

Traditionally capacity licenses are configured for a maximum capacity usage in a network node. An operator prebooks a certain amount of resources and pays for the configured node capacity to the vendor. An aggregated license usage on a larger scope (area, multiple nodes) would enable a trunking gain such that the operator can book less capacity and use the booked capacity more freely depending on where the traffic is located at different times. Even further, by a resource usage system and a billing system license charging could be dynamic and not pre-booked. Hence, the operator pays for the exact usage.

Different vendors' RBSs may have different load balancing algorithms and to facilitate load balancing between the vendors a central master entity may improve performance by avoiding sub optima and by coherent executions. Embodiments herein provide ways to manage and supervise load usage according to license for a vendor.

Load balancing in this context is about redistributing load between cells. This can for example be realized by changing mobility parameters. By changing mobility parameters the cell size coverage is changed. The mobility parameters tell when to measure on neighbor cell(s) and when to change cell. A cell may have one set of mobility parameters for each neighbor cell or one set for all neighbor cells. When performing load balancing it would be basically necessary to have a set of mobility parameters per neighbor cell. Hence, cell A will have a set of mobility parameters for neighbor cell B and another set of mobility parameters for neighbor cell C. Cell B will have a set of mobility parameters for neighbor cell A. If cell B and cell C is neighbors then cell B will have a set of mobility parameters to cell C, and vice versa. When cell A changes mobility parameters for a neighbor cell, cell B, the neighbor cell will most likely also need to change its mobility parameter for cell A. Otherwise, poor mobility may be the outcome.

So the neighboring RBSs need to be informed about a change of mobility parameters in neighbor cells or be requested to update its mobility parameters. Embodiments are provided where the network can perform load balancing by automatic reconfiguration of mobility parameters or of other parameters that shift the load between cells.

The VRBS 30 acts like an RBS from an internode interface II perspective, but may comprise other capabilities than an ordinary RBS. The VRBS 30 may be a logical entity deployed in a dedicated server or as an integral part of the networks management system, e.g. an Operation Support System, OSS, or the like. Unlike the RBS, the VRBS is not a traffic node providing bearer services; it does not comprise an air interface or have any cells in reality, only virtual cell/s. Where RBSs connect to their local, neighboring RBSs over internode interface II, the VRBS may connect to any RBS within the network over internode connections to cover a larger, contiguous area.

Furthermore, the VRBS 30 may, in some embodiments, be arranged to collect information from the RBSs 10,12 over internode interface II and processes the information for enabling centrally processing the information e.g. for load monitoring to report or display capacity bottlenecks, configuration management to automatically allocate capacity licenses where needed or to reallocate physical cell identity PCI, automatically adjust any configuration parameters based on load measures, for example configured RACH parameters and antenna tilt, capacity usage supervision to charge the Operator of the actual capacity used and/or to control the load usage so that it does not exceed the capacity license agreement, load balancing e.g. to adjust mobility parameters to adjust and balance load between cells, and/or the like.

Ideally all RBSs are connected to a Virtual RBS (VRBS). The Virtual RBS has full mesh to all or a subset of all the RBSs.

Embodiments provide a base for multiple applications on an aggregated network level for e.g. load monitoring, load balancing, capacity adaptation and configuration management. Trunking efficiency by pooling the licensed capacity or charging based on used capacity provides options to manage the capacity utilization.

Load balancing may be used, using one algorithm for all RBSs independently of RBS vendor, or software releases. Decisions can be made on wider information scope, not only on very local information.

In the stated examples, load information of the internode interface II is retrieved. However, other local information relevant for other central processes may be retrieved, such as interference related information and/or the like.

Figure 2:
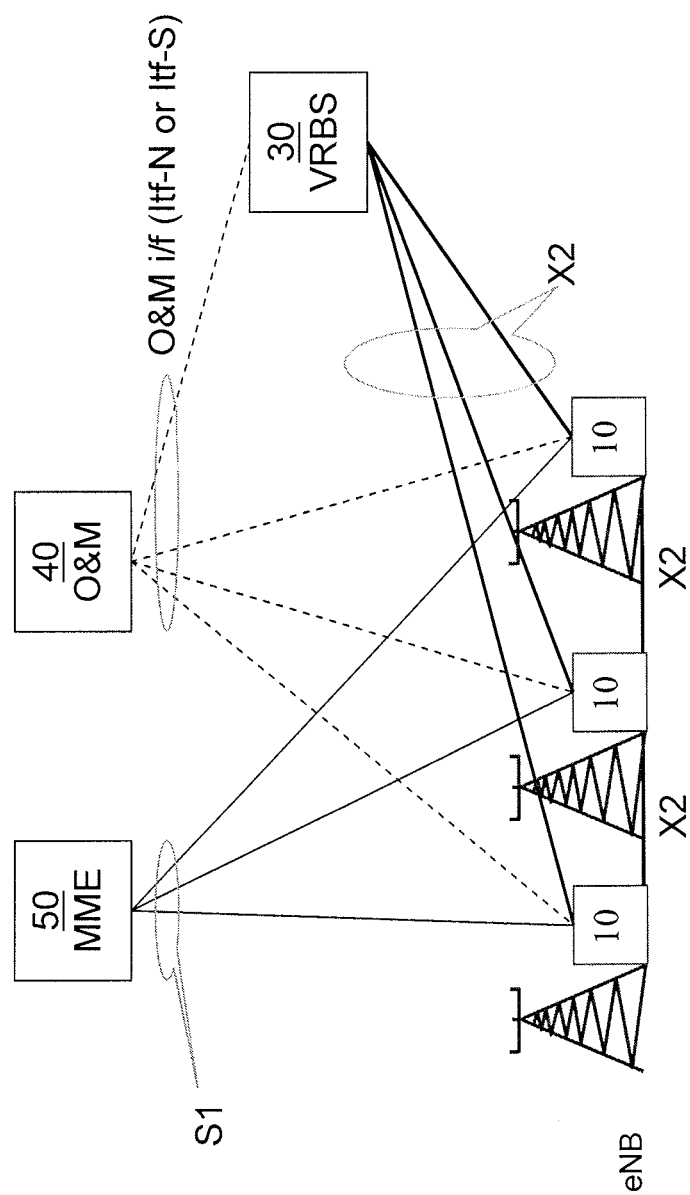
FIG. 2 shows a schematic overview of an EPS deploying one Virtual Radio Base station, VRBS.

In FIG. 2, a schematic overview of an exemplary EPS network is shown.

The network comprises a plurality of base stations, denoted as eNBs 10, connected to a VRBS 30 with X2 connections within the radio access network. The eNBs 10 are also connected to neighbor eNBs with X2 connections. An MME 50 is connected to each eNB 10 over an S1 connection and an Operations and Maintenance node, O&M, 40 is connected to each eNB 10 over an O&M interface, such as an Itf-S och Itf-N or the like.

The VRBS 30 may have an interface to the O&M 40 node by an O&M interface, e.g. Itf-S or Itf-N interface. It should be understood that the VRBS may be a part of the O&M node 40.

The eNBs 10 send information over the X2 connections to the VRBS 30 for the VRBS 30 to process the information. For example, the VRBS 30 may aggregate local information from eNBs 10 and send the aggregated information to the O&M node 40 for the O&M node 40 to centrally process the information.

Figure 3:
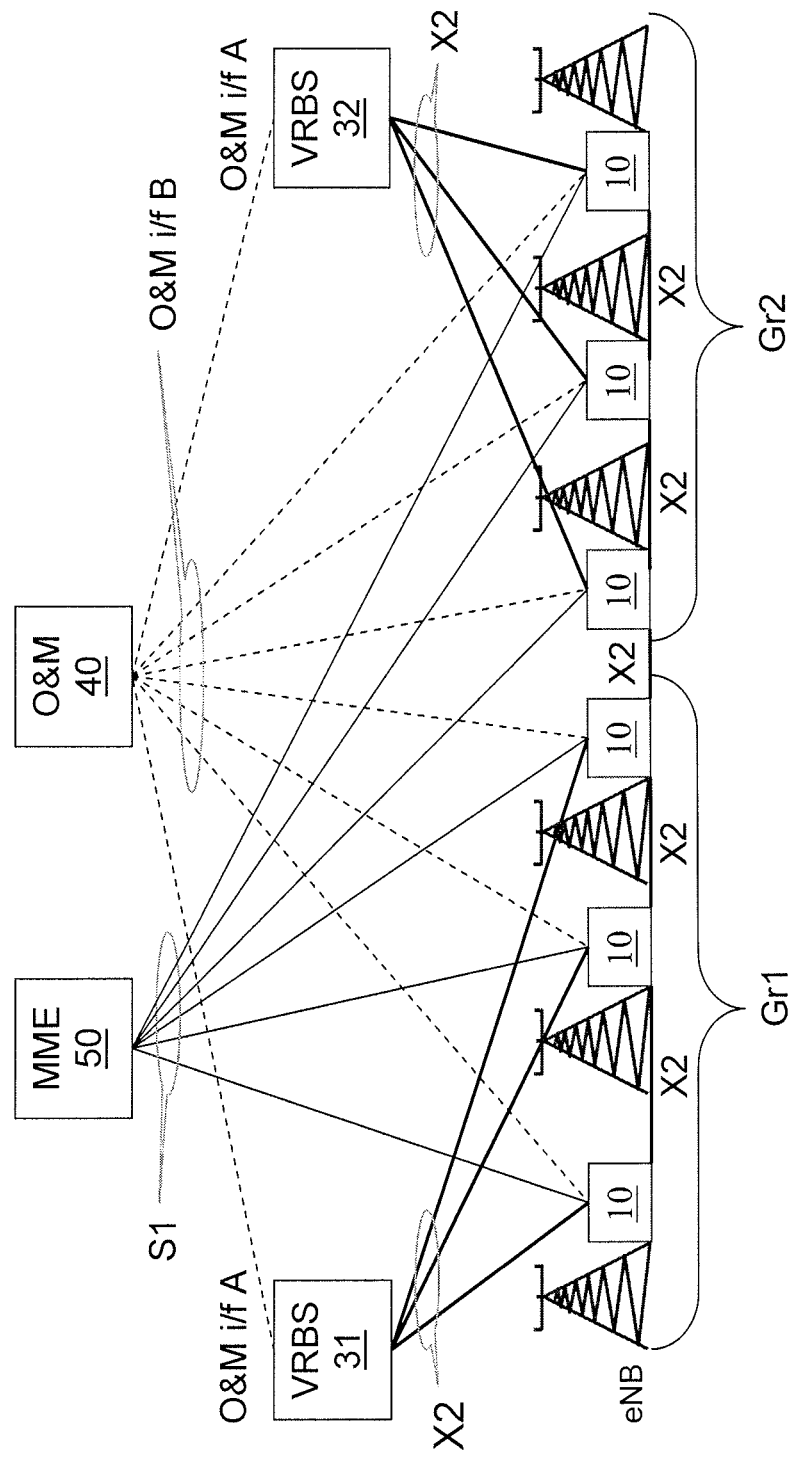
FIG. 3 shows a schematic overview of an EPS deploying multiple VRBSs.

In FIG. 3, a schematic overview of an exemplary embodiment of an EPS network is shown.

The network comprises a first group Gr1 of eNBs 10 connected to a first VRBS 31 with X2 connections in EUTRAN of EPS. Furthermore, the network comprises a second group Gr2 of eNBs 10 connected to a second VRBS 32 with X2 connections within the EUTRAN of EPS. It should here be understood that the network may comprise additional VRBSs and an eNB may be connected to more than one VRBS, for example if an eNB has neighbouring eNBs connected to different VRBSs.

The eNBs 10 are also connected to neighbor eNBs with X2 connections. An MME 50 is connected to each eNB 10 over an S1 connection and an O&M node 40 is connected to each eNB 10 over an O&M interface i/f, such as Itf-S, Itf-N or the like.

The VRBSs 31, 32 may have an interface A to O&M 40 and the eNBs, in groups Gr1 and Gr2, an interface B to the O&M 40 e.g. Iff-S, Itf-N and/or the like.

The eNBs 10 send information over the X2 connections to the VRBSs 31, 32, respectively, for the VRBSs 31, 32 to process the information. For example, the VRBS 31 may aggregate local information from eNBs 10 of Gr1 and the second VRBS 32 may aggregate local information from eNBs 10 of Gr2. The aggregated information is then transmitted over the O&M i/f B to the O&M node 40 for the O&M node 40 to centrally process the information. The O&M node 40 may then transmit configuration data to eNBs 10 over the O&M node i/f A based on the central processing.

Figure 4:
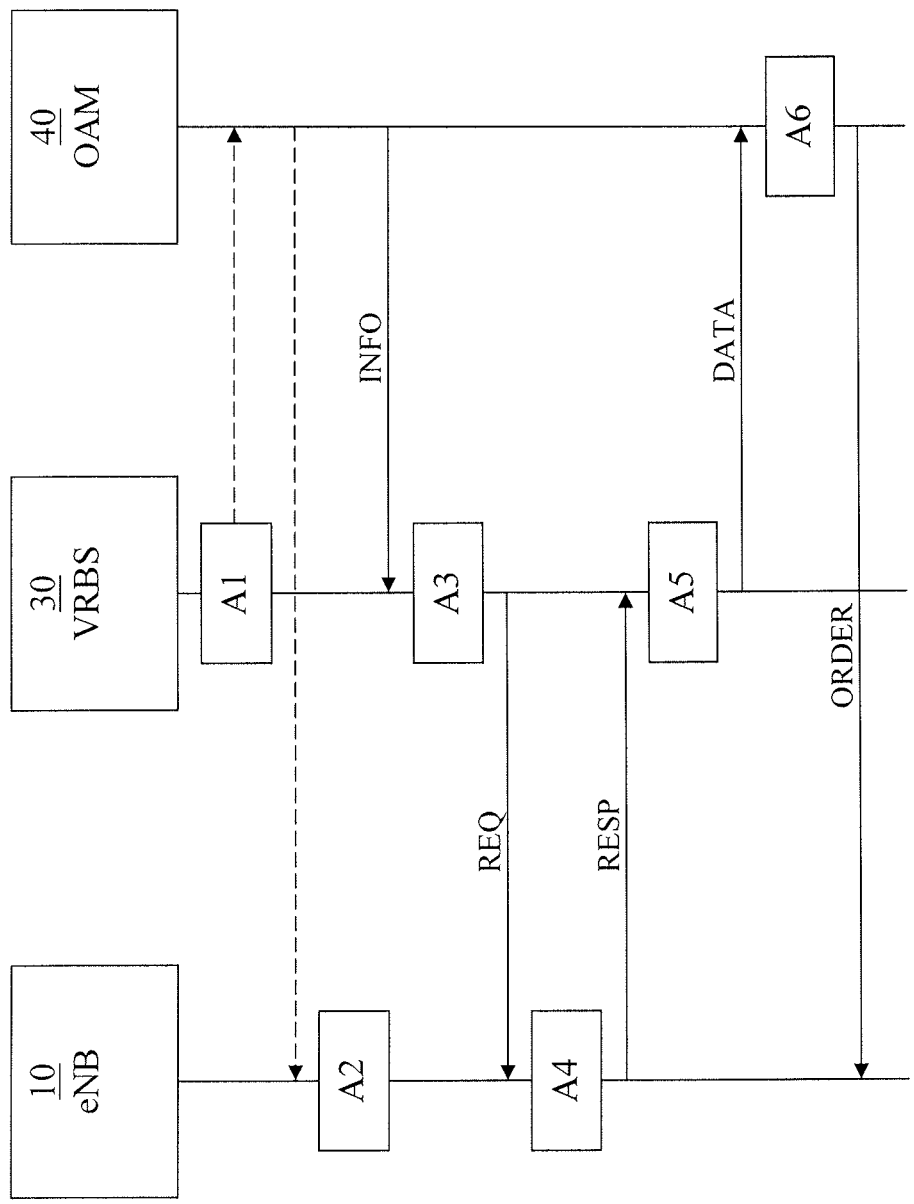
FIG. 4 shows a schematic overview of a combined signal and method scheme in an EPS.

In FIG. 4, a schematic overview of an exemplary combined signal and method scheme in an EPS is shown. In the EPS network, a base station is denoted as an evolved NodeB, eNB.

In an optional initial step A1, a VRBS 30 is provided with a virtual cell configuration. This may be done before installation, during installation and/or sent to the VRBS 30.

In an optional second step A2, all associated eNBs may be configured by an O&M 40 to regard any X2 interface to the virtual cell of the VRBS not to be used for HandOver, HO.

The O&M node 40 may, in some embodiments, send information of eNBs within a wireless communications network to a VRBS 30 over interface A or the like from EPC to the EUTRAN. The information may comprise configuration of eNBs, neighbor relationship of eNBs, capacity of eNBs and/or the like.

In step A3, the VRBS 30 analyses the information from the O&M node 40 and initiates a request REQ to establish an X2 connection to an eNB 10 and requests X2 information from the eNB 10. It should be understood that a similar request is sent to other eNBs connected to the VRBS 30 via X2 interface in order to enable centrally processing X2 information of a plurality of eNBs. Embodiments comprise a new entity here called Virtual RBS that uses the X2 interface to eNBs to collect and centrally process local information from eNBs.

An X2 connection is established between the VRBS 30 and the eNB 10, that is, the VRBS 30 or the eNB 10 initiate a setup of an X2 interface between them. The VRBS requests and gets the cell information from the cells of eNB 10 and/or vice versa. The X2 protocol is such that the VRBS 30 needs to send information about at least one, virtual, serving cell, for example, having no radio traffic load. The virtual cell does not exist on the radio interface, hence, the VRBS may not comprise a radio interface. The VRBS 30 inhibits the X2-interface to be used in a handover process.

It should be noted that the interference information signalling procedure over X2 can be turned on or off depending on VRBS functional support.

In some embodiments the VRBS 30 has a load collecting function. The VRBS 30 requests load information from the serving cells of the eNB 10 by sending a request message. The eNB 10 that receives the message starts to report load periodically according to the request. If the eNB 10 requests load information from the VRBS 30, the VRBS 30 will reject the request with a failure message.

The VRBS 30 may cease the periodic load reporting by sending a request to the eNB 10 to stop the reporting.

In step A4, the eNB 10 responds RESP to the REQ and transmits the requested X2 information to the VRBS 30.

In step A5, the VRBS 30 processes the received X2 information with information from different eNBs into processed data DATA that may be evaluated at the VRBS 30 and/or transmitted further to the O&M node 40. The VRBS 30 may be arranged to perform a number of functions based on gathered X2 information such as load monitoring, load balancing, interference coordination, capacity license allocation, parameter configurations, and/or the like.

In optional step A6, the O&M node 40 receives the processed data and performs the number of functions based on gathered X2 information such as load monitoring, load balancing, interference coordination, capacity license allocation, parameter configurations, and/or the like.

The result of the functions may comprise data that need to be distributed to the eNB 10 wherein an order or other data ORDER are transmitted to the eNB 10 from the O&M node 40. This data may alternatively be transmitted via the VRBS 30.

In the illustrated examples, the local internode interface between nodes in EUTRAN is used. However, other internode interfaces within a RAN of a different telecommunications network may be used, supporting local information to be exchanged between nodes with similar functions.

FIGS. 5-10 show some examples of VRBS functions, besides for the load collection, and how the VRBS uses the load information etc. Also here the illustrated examples are performed within an EPS network and the local internode interface between nodes in EUTRAN is used. However, other/similar telecommunications network systems with internode interfaces within a RAN of the telecommunication system may be used.

Figure 5:
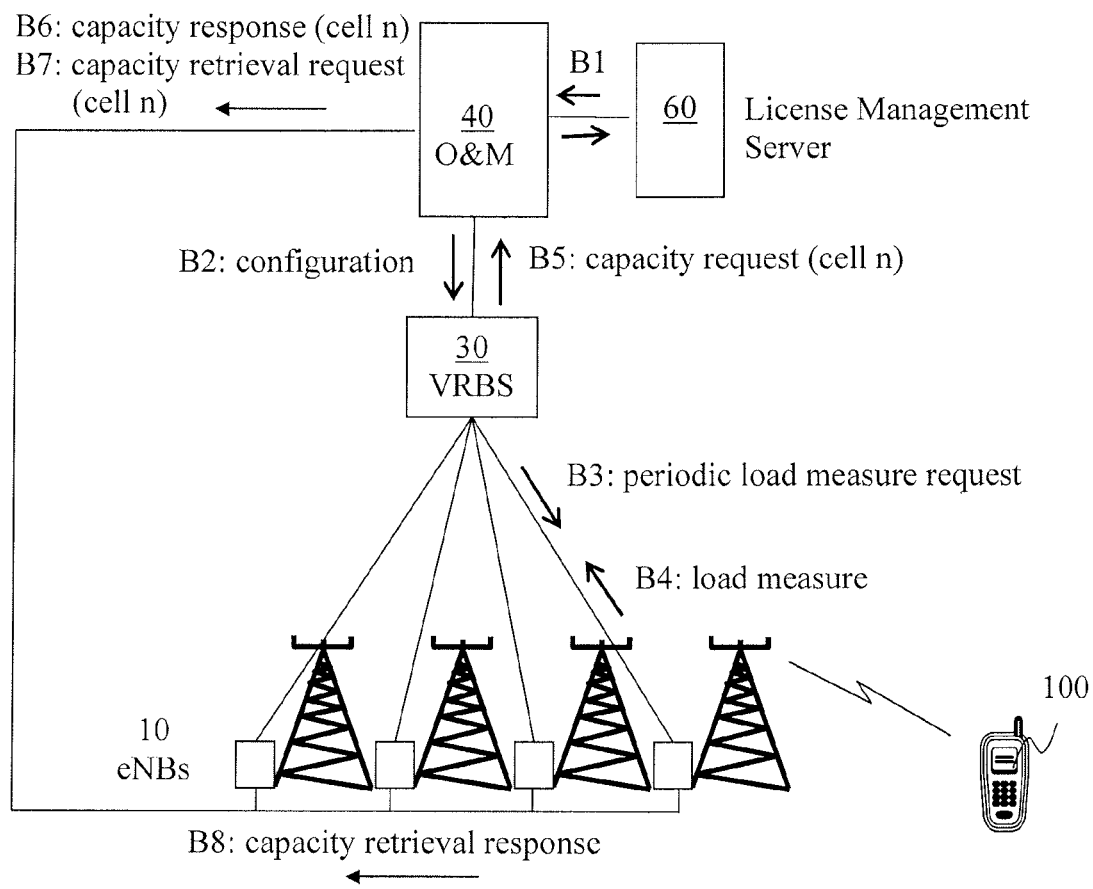
FIGS. 5 shows an example of an automated capacity allocation in a mobile communications network.

In FIG. 5, an example of an automated capacity allocation in a communications network is shown.

A proposed capacity licensing mechanism allows a set of eNBs 10 to share a pool of capacity licenses registered in a License Management Server 60. The communications network comprises an evaluating VRBS 30 arranged to receive and process X2 information from the eNBs 10 enabling the allocation.

The VRBS 30 may have a capacity license function where it monitors the load usage of the eNBs and dynamically requests capacity to eNBs 10 and requests retrieval of capacity from eNBs 10. Hence, the capacity is more flexible enabling a very attractive dynamic capacity function for the operators. The O&M node 40 executes the license allocation and retrieval to/from eNBs.

In step B1, an O&M node 40 manages a pool of floating capacity licenses, possible in conjunction with the external license management server 60, where a license may be assigned to any eNB 10.

In step B2, the O&M node 40 provides information to the VRBS 30 of the configured capacity of all eNB/cells 10 associated with the VRBS 30.

In step B3, the VRBS 30 requests periodic load measures from the connected cells with UEs 100 of eNBs 10.

In step B4, the VRBS 30 receives the load measures per cell of UEs 100 from the eNBs 10, evaluates and compares with the configured capacity. The load measures may be averaged over a configurable period, e.g. using a sliding window.

In step B5, when the load exceeds a configured capacity threshold in a cell, the VRBS 30 requests an extra amount of capacity from O&M node 40. The cell capacity threshold may be implicitly defined as an offset from the configured capacity or an explicit parameter.

In step B6, the O&M node 40 returns the capacity requested if available in the capacity license pool, otherwise the eNB 10 is informed of the lack of capacity and can take proper actions, and the O&M node 40 notifies the Operator of the lack of capacity.

In step B7, when the load subsides below a configured capacity threshold in a cell, the VRBS 30 requests the O&M node 40 to request the eNB 10 to return the extra amount of capacity previously allocated. The cell capacity threshold may be implicitly defined as an offset from the configured capacity or an explicit parameter.

In step B8, the eNB 10 returns the capacity requested to the license management server 60 via the O&M node 40.

The capacity license pool may be shared among a number of eNBs e.g. defined per
- set of eNBs
- MME pool area
- tracking area
- service area
- some non-standardized configurable area concept Examples of capacity licenses could be
- N PRBs per M eNBs with three cells per eNB
- N PRBs per tracking area
- N PRBs on tracking area 1, and M PRBs on tracking area 2, etc.

where M and N are configurable numbers and PRB are the Physical Resource Blocks shared.

Figure 6:
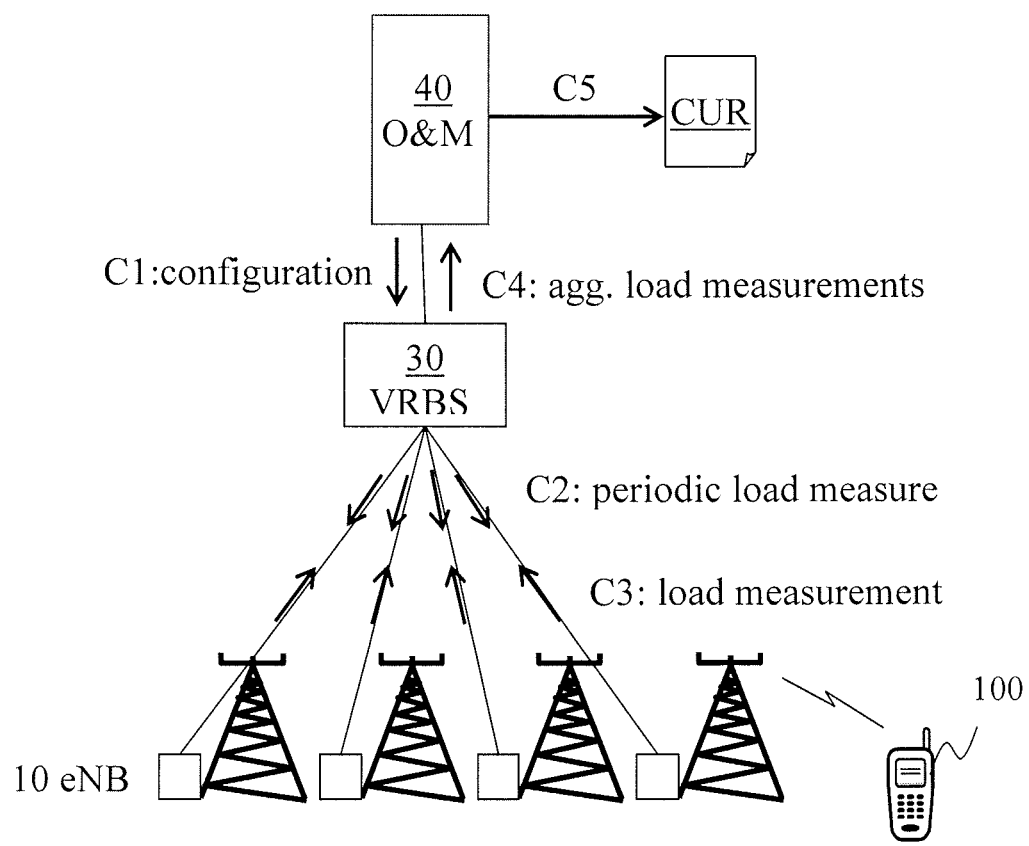
FIG. 6 shows an example of an automated capacity utilization monitoring in a mobile communications network.

In FIG. 6, an example of an automated monitoring of capacity utilization in a EUTRAN is shown.

A VRBS 30 may have a capacity monitoring function where it accounts and supervise actual capacity usage. In order for the VRBS 30 to be enabled to provide this function, the VRBS 30 is connected to a plurality of eNBs 10 over X2 connections and an O&M node 40 over an O&M interface.

In step C1, the O&M node 40 configures the associated VRBSs 30 to periodically derive a capacity utilization report, CUR.

In step C2, the VRBS 30 initiates periodic load measurement reports from its associated eNBs 10.

In step C3, the eNBs 10 periodically provides load measurement reports of cells with UEs 100 to the VRBS 30.

In step C4, the VRBS 30 accumulates and aggregates the received load measurements and reports the load carried by the associated eNB and cells with the configured periodicity to the O&M node 40.

In step C5, the O&M node 40 aggregates the load measurement reports received from all its associated VRBSs and derives a total CUR as a base for charging an Operator of the actual capacity used.

It should be noted that the CUR may alternatively be derived at the VRBS 30 and forwarded to, for example, the O&M node 40.

Figure 7:
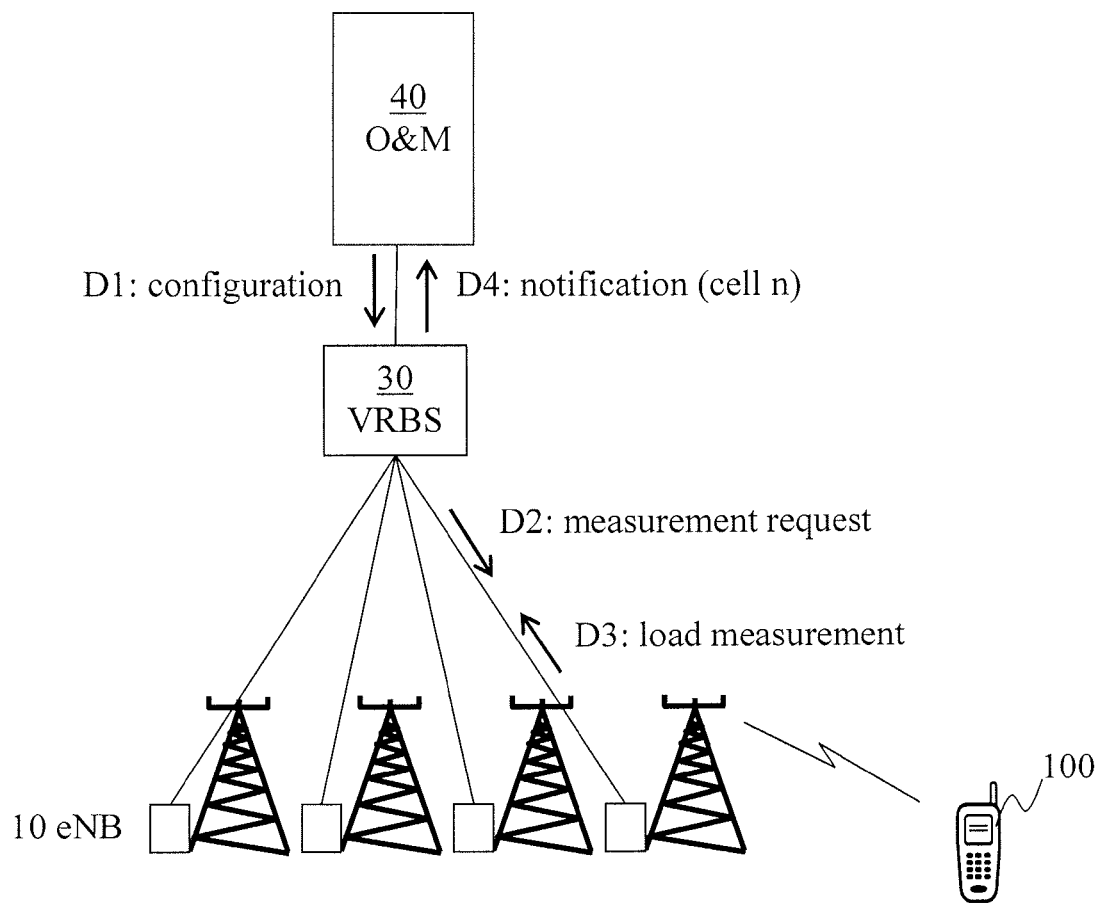
FIG. 7 shows an example of a solution of automated bottleneck detection in a mobile communications network.

In FIG. 7, an example of a solution of automated bottleneck detection using X2 load information is illustrated.

A VRBS 30 is embodied with a capacity supervision and bottleneck detection function in a EUTRAN network.

In step D1, an O&M node 40 connected to the VRBS 30 via an O&M interface provides information of the configured capacity of all eNB/cells associated with the VRBS 30.

In step D2, the VRBS 30 requests periodic load measures from cells of eNBs 10 associated and connected to the VRBS 30 via X2 interfaces.

In step D3, the VRBS 30 receives the load measures per cell and compares with the configured capacity. The load measures may be averaged over a configurable period, e.g. a sliding window.

In step D4, based on the configured capacity and the measured capacity each VRBS may proactively send a notification to the O&M node 40 informing of the potential bottleneck, that is, a capacity shortage exist.

The O&M node 40 may then present the information to an Operator and/or the like.

Figure 8:
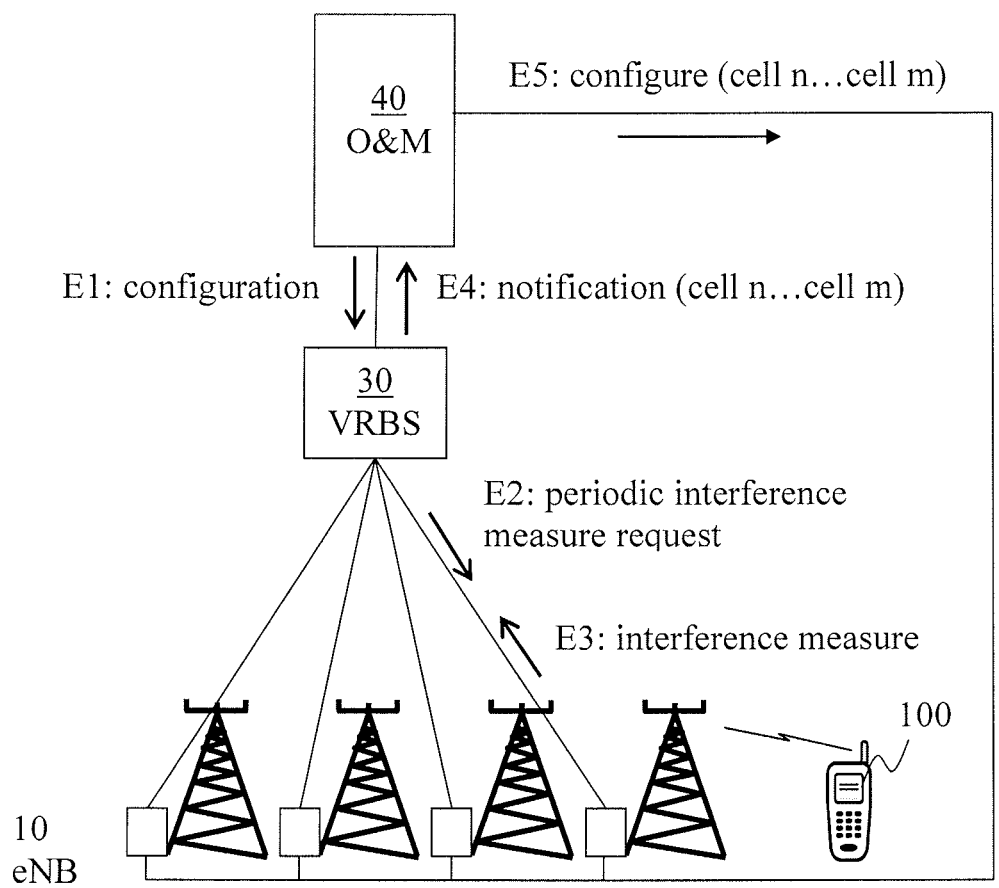
FIG. 8 shows a schematic overview of a method in a communication node.

In FIG. 8, a VRBS 30 comprises a configuration function based on interference measurements.

In step E1, an O&M node 40 sends associated eNBs configuration, for example, the neighbor relation information of the eNBs to the VRBS 30.

In step E2, the VRBS 30 requests periodic interference measures from cells n to m of eNBs 10 connected to the VRBS 30 over X2 connections.

In step E3, the VRBS 30 receives interference measures per cell and evaluates/processes the received measures.

In step E4, the VRBS 30 notifies the O&M node 40 about the received and processed interference measurements, for example, that a couple of cells are interfering.

In step E5, the O&M node 40 configures parameters in the eNBs 10 to reduce/remove interference between cells.

Figure 9:
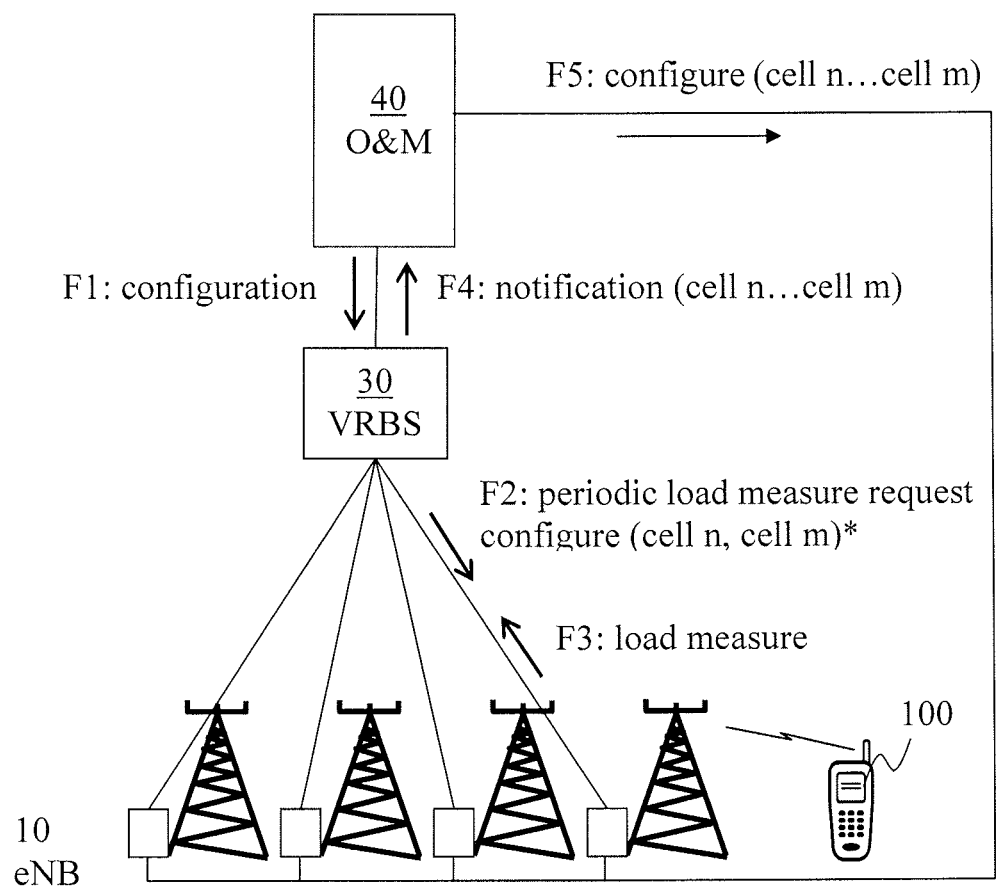
FIG. 9 shows a schematic overview of a communication node.

In FIG. 9, a VRBS 30 comprises a load balancing function or provide load information to e.g. O&M node 40 and/or the like, which performs the load balancing function.

The VRBS 30 comprising a load balancing function knows which cells are neighbors, since it needs to compare the load between neighbor cells and adjusts the mobility parameters to offload an overloaded cell.

In step F1, the O&M node 40 sends the neighbor relation information of the eNBs 10 to the VRBS 30. The neighbor relation information may comprise Cell Global Identity, CGI, of a cell and which CGIs are neighbors. Alternatively, the O&M system gets the neighbor relation information from eNB, e.g. provided by the ANR function.

In step F2, the VRBS 30 requests periodic load measures from cells n to m of eNBs 10 connected to the VRBS 30 over X2 connections.

In step F3, the VRBS 30 receives the load measures per cell and compares load between neighbor cells.

When the VRBS 30 detects a need for load balancing between two cells there are some possible actions, such as:

In step F4, the VRBS 30 sends, directly over X2 or indirectly via O&M, new mobility parameters, as absolute values or relative changes, to the eNB 10 and requests the eNB 10 to update its mobility parameters accordingly.

In step F5, a multi-vendor solution may be provided using the Itf-N to configure mobility parameters in the eNB. An alternative is to use the X2 interface to change mobility parameters and requires a standardized X2 interface in this respect.

The VRBS 30 may instead of step F4, notify a cell in a neighbor relation that the opposite cell has changed its mobility parameters with a certain amount. The assumption then would be that the eNB 10 changes its parameters to compensate for the changes done. This requires a standardized X2 interface to provide multi-vendor interoperability, also regarding configuration of mobility parameters.

Figure 10:
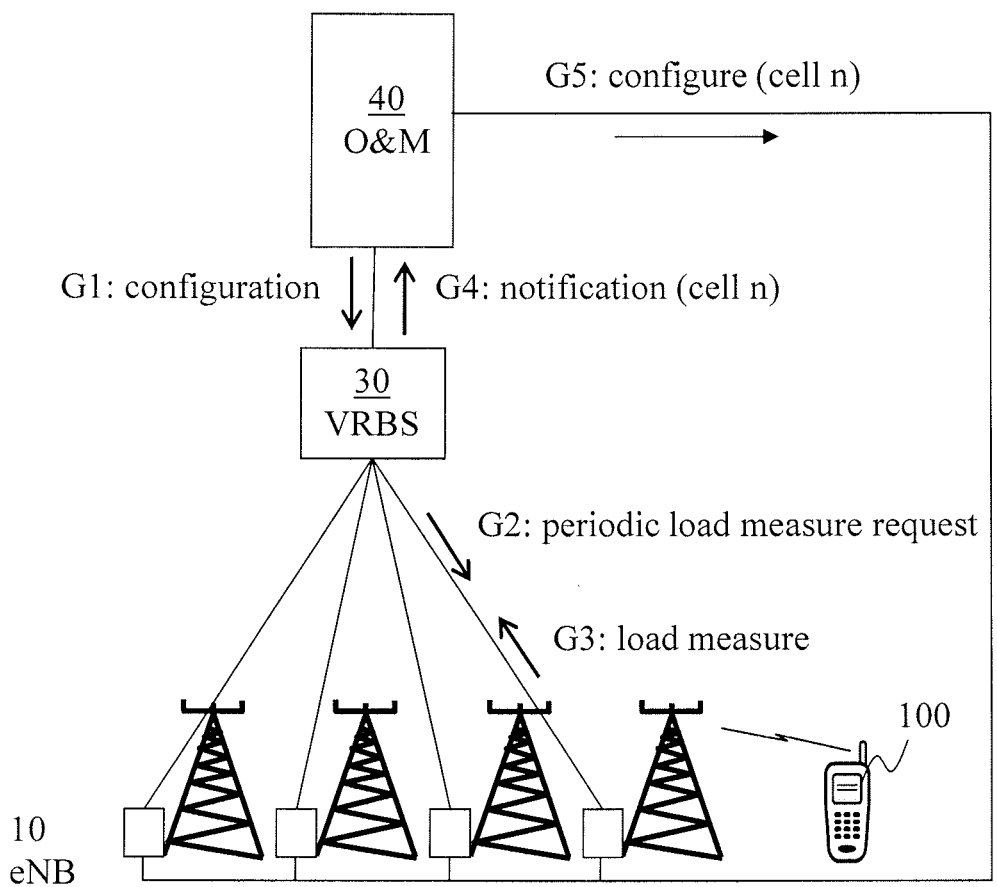
FIG. 10 shows a schematic overview of deploying the VRBS in another embodiment.

In FIG. 10, a VRBS 30 comprises a parameter configuration optimization function. The following is a high level example of a parameter configuration optimization function.

In step G1, an O&M node 40 provides network configuration information to the VRBS 30.

In step G2, the VRBS 30 requests periodic load measures from the cells of eNBs 10 connected to the VRBS 30.

In step G3, the VRBS 30 receives the load measures per cell and may compare with previous load measures of the cells.

In step G4, if a more optimal configuration is found, to e.g. enhance capacity or performance, the VRBS 30, via a notification to the O&M node 40, requests one or several eNBs to reconfigure some of their associated parameters, e.g. antenna tilt and/or Random Access CHannel, RACH, configurations.

In step G5, the O&M node 40 transmits the configuration to the eNBs 10.

Using a VRBS 30, enables the possibility, in some embodiments, to provide a more dynamic provision of capacity/performance as the operator has a more flexible way of distributing capacity/performance to different eNBs. For example, resources may be distributed much more fluently, today one would subscribe to forty lines over four eNBs each comprising ten lines; by using a VRBS these forty would be possibly allocated dynamically to the four eNBs based on the capacity requirement.

The implementation of the VRBS functionality enables centrally taken decisions on local information. The VRBS functionality may be implemented as new logic into an existent node or as hardware in a new node. Today, information of radio base stations, retrieved over an Operation Support System (OSS) Interface, may be centrally managed using an Operation Support System in a Wireless Communication Network. Alternatively, the information may be centrally managed in a Network Manager (NM). The OSS does not have connection to more than one vendor's Radio Access Network (RAN) nodes and different vendors OSSes may lack possibility to signal some information that is available over internode interfaces, may also be called inter-RAN node interfaces. Moreover, the network manager may have information from different vendors but even the NM may lack information that is available over internode interface. Furthermore, the information over the internode interface has a more frequent signaling which enables more real-time network management. The internode interface is not defined as an Operation and Maintenance (O&M) interface. But the internode information can benefit from central processing and O&M interaction.

Figure 11:
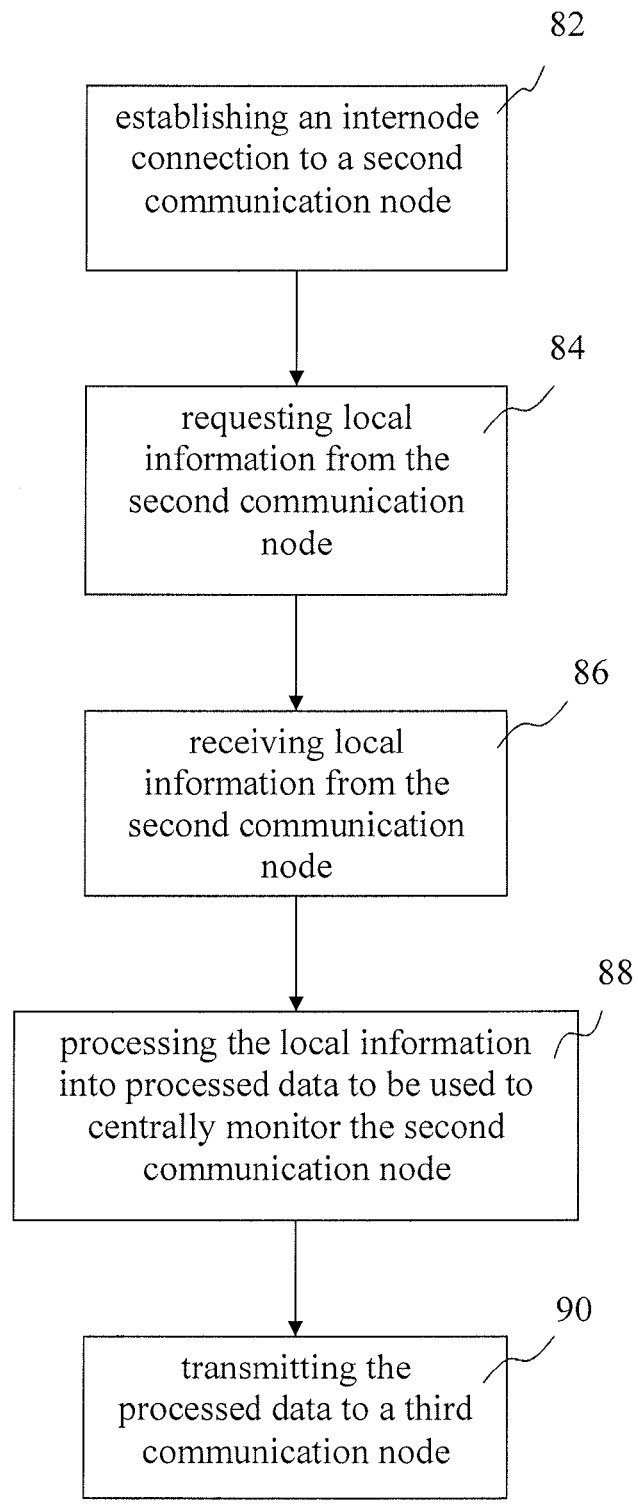
FIG. 11 shows a schematic overview of a method in a first communication node in a wireless communications network comprising one or more second communication nodes.

In FIG. 11, a schematic overview of a method in a first communication node in a wireless communications network comprising a number of second communication nodes within a radio access network of the wireless communications network, such as eNodeBs and/or the like, is shown.

In some embodiments, the radio access network comprises an E-UTRAN, UTRAN and/or the like.

The first communication device may in some embodiments receive configuration information from an O&M node, such as neighbor relations of eNodeBs associated to the first communication node.

In step 82, the first communication node establishes an internode connection connecting nodes within the radio access network, such as an X2 connection, Iur connection and/or the like, to a second communication node, whereby the first communication node sends information of a virtual cell of the first communication node. The virtual cell does not carry any user plane traffic. The internode connection (over the traffic interface) may be established to second communication nodes that not necessarily are adjacent communication nodes and any set of second communication nodes.

In step 84, the first communication node requests local information from the second communication node. Local information may comprise load information, interference related information, configuration related information and/or the like of one or more cells of the second communication node.

In step 86, the first communication node receives local information from the second communication node.

It should here be understood that in some embodiments the first or a third communication node may also send a message to the second communication node inhibiting the internode connection to the first communication node in the radio access network to be used for handover. The first communication node may belong to a network unique MME pool and when the second communication node is informed about this then it knows that a handover preparation over X2 will not work.

In some embodiments, the first communication node may receive a request handover from at least one of the second communication nodes, and the first communication node responds with a failure message rejecting the request to the second communication node in order to avoid using the associated internode connection for handover.

In some embodiments, the first communication node may receive a request of local information from at least one of the second communication nodes, and the first communication node responds with a failure message rejecting the request to the second communication node in order to avoid sending measurements to the second communications node.

In step 88, the first communication node processes the local information into processed data to be used to centrally process data from the second communication node. For example, the first communication node may aggregate/accumulate local information from the second communication nodes. The local information may in some embodiments be processed with local information from at least one other second communication node into processed data.

In some embodiments, the first communication node may perform the centrally processing. Hence, the first communication node analyses and centrally processes the processed data, for example, monitors the load, adapts the capacity, real-time monitoring, bottleneck detection, load balancing, physical cell identity reconfiguration, interference management and/or the like, of a plurality of eNBs.

After the centrally processing is performed the first communication node may in some embodiments, via a third communication node or directly, transmit a configuration order to at least one second communication node stating a certain parameter configuration based on the analysis and central processing. For example, the first communication node may transmit an antenna angle tilt and a RACH configuration parameter to the second communication node and/or a cell of the second communication node.

In optional step 90, the first communication node transmits the processed data to a third communication node over a second interface, such as an Itf-S, Itf-N or the like. A third communication node comprises an O&M node, and/or the like, arranged to centrally process the processed data, for example, monitoring the load, adapting the capacity, real-time monitoring, bottleneck detection, load balancing, physical cell identity reconfiguration, interference management and/or the like. The processed data may be of local information of one or several second communication nodes and be centrally processed with or without further information given in the third communication node.

In order to perform the method a first communication node is provided.

Figure 12:
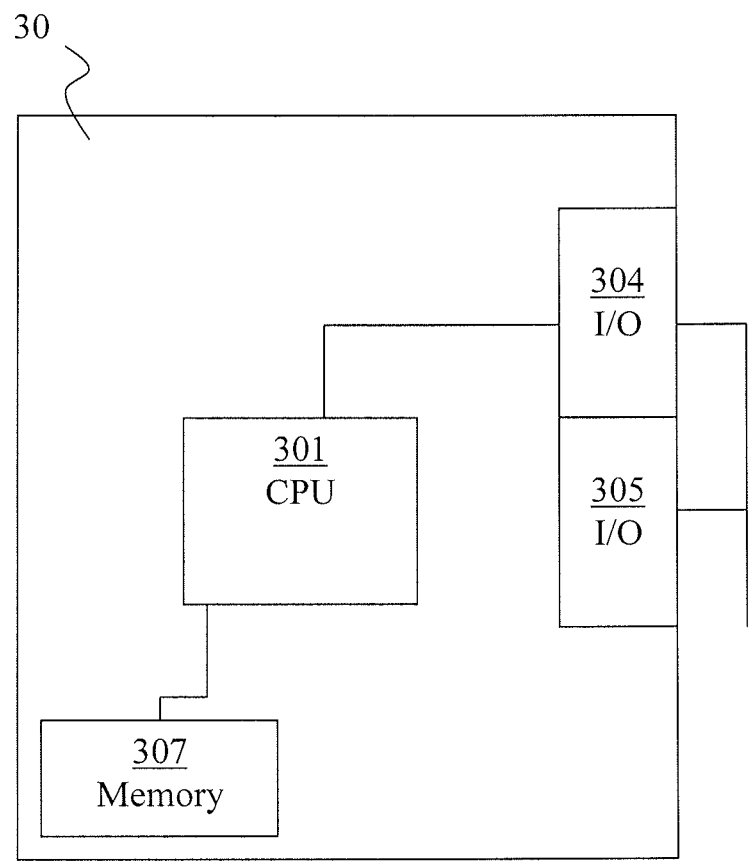
FIG. 12 shows a hardware structure of a first communication node.

In FIG. 12, a schematic overview of a first communication node 30 in a wireless communications network is shown.

The first communication node may comprise an O&M node, a dedicated server such as a Virtual RBS or the like, and/or the like.

The first communication node 30 comprises an internode network interface 304 arranged to establish an internode interface in a radio access network of the wireless communications network to a plurality of second communication nodes within the wireless communications network, during which the control unit 301 sends information of at least one virtual cell to the second communication node over the internode network interface 304.

It should be understood that the internode interface comprises an interface connecting nodes, such as base stations or the like, exchanging local information of the nodes over the interface in the radio access network. In some embodiments, the internode network interface may comprise an X2 interface, Iur Interface and/or the like.

The radio access network may comprise a EUTRAN, UTRAN or the like.

Furthermore, the first communication node 30 comprises a control unit 301 arranged to request local information from at least one of the second communication nodes over the internode network interface 304 and to receive local information from the at least one second communication node over the internode network interface 304. The control unit 301 is further arranged to process the received local information to provide processed data for enabling a central decision to be taken based on the processed data. The local information may comprise information of one or more cells of the second communication node and/or cells of other second communication nodes. The processing may comprise to accumulate/aggregate local information of the second communication nodes.

In some embodiments, the control unit 301 is further arranged to analyse the processed data, to centrally process the processed data, and to transmit a configuration parameter order to at least one second communication node via a third communication node over a second network interface 305 stating a certain configuration order based on the analysis/central processing. For example, the first communication node may transmit an angle tilt and a RACH configuration parameter to the second communication node via the third communication node and/or directly. The third communication node may be an O&M node and/or the like, connected to the first communication node over an O&M interface and/or the like. Hence, the configuration change is based on the first communication nodes info and in some embodiments wherein X2 interface is expanded then this could be done directly by the first node. It should be understood that the first node may get more information from the third node and process all the received information.

In some alternative embodiments, the control unit 301 is arranged to transmit the processed data to the third communication node over a second network interface 305, such as an Itf-N, Itf-S and/or the like. The processed data is then used at the third communication node to centrally process data of the second communication node, for example, to monitor the load, to adapt the capacity, real-time monitoring, bottleneck detection, load balancing, physical cell identity reconfiguration, interference management and/or the like. And the third communication node may then transmit data/configuration data to the second communication nodes directly or via the first communication node. The third communication node may centrally process local information of one or several second communication nodes, with or without further information given in the third communication node.

In addition, the control unit 301 may be arranged to send upon a request of cell information from a second communication node, information of the virtual cell of the first communication node comprising no load.

In some embodiments, the control unit 301 is further arranged to send a message to the second communication node, over the internode network interface 304 or over the second interface 305 via the third communication node, inhibiting the internode connection in the radio access network to be used for handover.

For example, the first communication node may be further arranged to receive a request of local information, such as load information of the virtual cell and/or the like, from at least one of the second communication nodes over the internode network interface 304. The control unit 301 is then further arranged to send a failure message rejecting the request from the at least one second communication node in order to avoid the associated internode connection to be used for measurement data from the first communication node to the second communication node.

For example, the first communication node is further arranged to receive a request for handover from at least one of the second communication nodes over the internode network interface 304. The control unit 301 is then further arranged to send a message comprising a failure message rejecting the request to the at least one second communication node over the internode network interface 304 in order to avoid the associated internode connection to be used for handover.

The local information may in some embodiments comprise load information, interference related information, configuration related information, and/or the like.

The first communication device furthermore comprises, in some embodiments, a memory unit 307. The memory unit 307 may have data stored thereon, such as capacity threshold values, neighbor relations between second communication nodes, and/or the like. Furthermore, applications may be stored thereon that when executed on the control unit 301 performs the above mentioned method.

The control unit 301 may comprise a CPU, a single processing unit, a plurality of processing units, and/or the like.

The memory unit 307 may comprise a single memory unit, plurality of memory units, internal and/or external memory units and/or the like.

In some embodiments, a radio access network comprises a plurality of first communication nodes.

Embodiments are described with reference to block diagrams and/or flowchart illustrations of methods, apparatus (systems). It is understood that several blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in a first communication node for enabling central processing of local information from each of a plurality of second communication nodes, wherein the first communication node and each second communication node are comprised in a wireless communications network, wherein the method comprises:
   establishing an internode connection in a radio access network of the wireless communications network to a second communication node, wherein in establishing the internode connection the first communication node sends to the second communication node information about a virtual cell of the first communication node, said virtual cell does not carry any user traffic, wherein the radio access network comprises an Evolved Universal Terrestrial Access Network (E-UTRAN) or an Universal Terrestrial Radio Access Network (UTRAN) and the internode connection comprises an X2 connection or an Iur connection.
   requesting local information from the second communication node via the internode connection,
   receiving local information from the second communication node via the internode connection responsive to said requesting, and
   processing the received local information into processed data that is to be used to centrally process the local information from the second communication node with local information from other second communication nodes.

2. The method according to claim 1, further comprising sending a message to the second communication node, via a third communication node, inhibiting the internode connection in the radio access network from being used for handover.

3. The method according to claim 1, further comprising receiving a request for local information from at least one of the second communication nodes, and responding to that at least one second communication node with a failure message rejecting the request, such that an internode connection established with the at least one second communication node is prevented from being used for transferring measurements from the first communication node to the at least one second communication node.

4. The method according to claim 1, further comprising receiving a request for handover from at least one of the second communication nodes, and sending a failure message to the at least one second communication node rejecting the request, such that an internode connection established with the at least one second communication node is prevented from being used for handover.

5. The method according to claim 1, further comprising transmitting the processed data to a third communication node that is configured for said central processing, wherein the processed data is transmitted over an interface for the third communication node.

6. The method according to claim 1, further comprising:
analyzing and centrally processing the processed data along with local information from other second communication nodes, and
transmitting a configuration parameter order to at least one of the second communication nodes stating a certain configuration based on said analysis and central processing.

7. The method according to claim 1, wherein local information comprises at least one of load information, interference related information, and configuration related information that is local to a particular second communication node.

8. The method according to claim 7, wherein centrally processing local information from second communication nodes comprises centrally processing local information to at least one of:
monitor a load of those second communication nodes,
adapt a capacity of those second communication nodes,
real-time monitor those second communication nodes,
detect a bottleneck in or associated with those second communication nodes,
balance a load amongst those second communication nodes,
reconfigure one or more physical cell identities for those second communication nodes, and
manage interference associated with those second communication nodes.

9. A first communication node configured to enable central processing of local information from each of a plurality of second communication nodes, wherein the first communication node and each second communication node are comprised in a wireless communications network, wherein the first communication node comprises:
an internode network interface configured to establish at least one internode connection in a radio access network of the wireless communications network to at least one of a plurality of second communication nodes, wherein the radio access network comprises an Evolved Universal Terrestrial Access Network (E-UTRAN) or an Universal Terrestrial Radio Access Network (UTRAN) and the at least one internode connection comprises an X2 connection or an Iur connection; and
a control unit configured to:
send to the at least one second communication node information about a virtual cell of the first communication node, when establishing the at least one internode connection, said virtual cell does not carry any user traffic;
request local information from the at least one second communication node via the at least one internode connection,
receive local information from the at least one second communication node via the at least one internode connection, and
process the received local information into processed data that is to be used to centrally process the local information from the second communication node with local information from other second communication nodes.

10. The first communication node according to claim 9, wherein the control unit is further configured to send a message to the at least one second communication node, via a third communication node and over a second network interface, inhibiting the at least one internode connection in the radio access network from being used for handover.

11. The first communication node according to claim 9, wherein the first communication node is configured to receive a request for handover from a second communication node over the internode network interface, and wherein the control unit is further configured to send failure message to that second communication node rejecting the request, such that an internode connection established with that second communication node is prevented from being used for handover.

12. The first communication node according to claim 9, wherein the first communication node is configured to receive a request for local information from a second communication node over the internode network interface, and wherein the control unit is further configured to respond to that second communication node with a failure message rejecting the request, such that an internode connection established with that second communication node is prevented from being used for transferring measurements from the first communication node to the second communication node.

13. The first communication node according to claim 9, wherein the control unit is further arranged to transmit the processed data to a third communication node over a second network interface for the third communication node to process data of the second communication node centrally.

14. The first communication node according to claim 9, wherein the control unit is further configured to:
analyze and centrally processing the processed data along with local information from other second communication nodes, and
transmit a configuration parameter order to at least one of the second communication nodes stating a certain configuration based on said analysis and central processing.

15. The first communication node according to claim 9, wherein local information comprises at least one of load information, interference related information, and configuration related information that is local to a particular second communication node.

16. The first communication node according to claim 15, wherein centrally processing local information from second communication nodes comprises centrally processing local information to at least one of:
monitor a load of those second communication nodes,
adapt a capacity of those second communication nodes,
real-time monitor those second communication nodes,
detect a bottleneck in or associated with those second communication nodes,
balance a load amongst those second communication nodes,
reconfigure one or more physical cell identities for those second communication nodes, and
manage interference associated with those second communication nodes.

17. The first communication node according to claim 9, wherein the first communication node comprises an Operation and Maintenance node or a dedicated server.

18. A radio access network comprising a plurality of first communication nodes, wherein each first communication node is configured to enable central processing of local information from each of a plurality of second communication nodes, wherein each first communication node and each second communication node are comprised in a wireless communications network, and wherein a first communication node comprises:
 an internode network interface configured to establish at least one internode connection in the radio access network to at least one of the second communication nodes, wherein the radio access network comprises an Evolved Universal Terrestrial Access Network (E-UTRAN) or an Universal Terrestrial Radio Access Network (UTRAN) and the at least one internode connection comprises an X2 connection or an Iur connection; and
 a control unit configured to:
  send to the at least one second communication node information about a virtual cell of the first communication node, when establishing the at least one internode connection, said virtual cell does not carry any user traffic;
  request local information from the at least one second communication node via the at least one internode connection,
  receive local information from the at least one second communication node via the at least one internode connection, and
  process the received local information into processed data that is to be used to centrally process the local information from the second communication node with local information from other second communication nodes.

* * * * *

UNITED STATES PATENT AND TRADEMARK OFFICE
CERTIFICATE OF CORRECTION

| | |
|---|---|
| PATENT NO. | : 9,204,313 B2 |
| APPLICATION NO. | : 13/129498 |
| DATED | : December 1, 2015 |
| INVENTOR(S) | : Dahlén et al. |

It is certified that error appears in the above-identified patent and that said Letters Patent is hereby corrected as shown below:

On the Title Page, in Item (57), under "ABSTRACT", in Column 2, Line 6, delete "intemode" and insert -- internode --, therefor.

Drawings

In Fig. 4, Sheet 4 of 12, for Tag "40", in Line 1, delete "OAM" and insert -- O&M --, therefor.

Specification

In Column 6, Line 20, delete "Iff-S," and insert -- Itf-S, --, therefor.

Claims

In Column 14, Line 47, in Claim 1, delete "connection." and insert -- connection, --, therefor.

Signed and Sealed this
Seventh Day of June, 2016

Michelle K. Lee
*Director of the United States Patent and Trademark Office*